United States Patent
Salour et al.

(10) Patent No.: US 9,898,698 B2
(45) Date of Patent: Feb. 20, 2018

(54) PRODUCTION TOOL HAVING RFID DEVICE MOUNTED WITHIN A DIELECTRIC INCLUSION

(75) Inventors: Ali Salour, Fenton, MO (US);
Ayyangar R. Harish, Kanpur (IN);
Santosh R. Ware, Barshi (IN)

(73) Assignee: The Boeing Company, Chicago, IL (US)

( * ) Notice: Subject to any disclaimer, the term of this patent is extended or adjusted under 35 U.S.C. 154(b) by 829 days.

(21) Appl. No.: 13/539,432

(22) Filed: Jun. 30, 2012

(65) Prior Publication Data
US 2013/0187759 A1    Jul. 25, 2013

Related U.S. Application Data

(60) Provisional application No. 61/504,168, filed on Jul. 1, 2011.

(51) Int. Cl.
*G06K 19/077* (2006.01)
*G06K 7/01* (2006.01)

(52) U.S. Cl.
CPC ......... *G06K 19/07771* (2013.01); *G06K 7/01* (2013.01); *G06K 19/077* (2013.01); *G06K 19/07758* (2013.01); *G06K 19/07749* (2013.01)

(58) Field of Classification Search
CPC .. B21H 1/02; G06K 19/077; G06K 19/07758; G06K 19/07771; G06K 7/01; G06K 19/07749; G06K 17/00; G06K 2017/0045; G06K 17/0029; G06K 7/0008; B25H 3/00; B25H 3/028; G06Q 10/087; G06Q 20/203; G06Q 10/00; G06Q 10/06; G06Q 10/10; G06Q 10/063; G06Q 10/101; G06Q 10/08; G06Q 50/30; G07C 9/00007; G07C 9/00896; G07C 3/00; G07C 5/085; G08B 13/14; G08B 13/2474; G08B 13/2477; G08B 13/2482; G05B 19/128; G05B 19/4183; G05B 2219/31322; G05B 2219/45031; G05B 19/41865; G05B 2219/31311; G05B 2219/49302; G05B 19/402; G05B 19/41805; G05B 2219/37593; B64F 5/0009; B64F 5/0045; H04Q 2209/845; H04Q 9/00;
(Continued)

(56) References Cited

U.S. PATENT DOCUMENTS 4,742,470 A    5/1988 Juengel
5,360,967 A    11/1994 Perkin
(Continued)

FOREIGN PATENT DOCUMENTS

JP    3035287 U    3/1997
JP    2004234484 A    8/2004
(Continued)

OTHER PUBLICATIONS

Japanese Office Action for Related Patent Application No. 2013-136136; Report dated Mar. 7, 2017.
(Continued)

*Primary Examiner* — Mirza Alam
(74) *Attorney, Agent, or Firm* — Miller, Matthias & Hull LLP

(57) ABSTRACT

A production tool has a dielectric inclusion, and an RFID device mounted within the dielectric inclusion.

20 Claims, 3 Drawing Sheets

(58) Field of Classification Search
CPC ........... H04Q 2209/30; H04Q 2209/40; H04Q 2209/823; G06F 2217/02; H04L 67/02; H04L 67/12; H04L 67/34; H04L 2209/80; H04L 9/12; H04W 4/02; H04W 4/18; A61K 9/1611; A61K 9/1617; A61K 9/1641; A61B 19/44; A61B 2019/448; A61B 90/90; G08G 1/096716; G08G 1/096741; G08G 1/096775
USPC ... 340/10.1, 5.72, 572.1, 568.1, 5.92, 10.42, 340/573.1, 572.4, 568.8; 235/492, 385, 235/375, 376; 701/29; 705/1, 28
See application file for complete search history.

(56) References Cited

U.S. PATENT DOCUMENTS

| | | | |
|---|---|---|---|
| 5,698,840 | A | 12/1997 | Jurisch et al. |
| 6,989,749 | B2 | 1/2006 | Mohr |
| 7,145,459 | B2 | 12/2006 | Wu et al. |
| 7,432,817 | B2 | 10/2008 | Phipps |
| 7,916,033 | B2 | 3/2011 | Westrick |
| 2003/0102970 | A1* | 6/2003 | Creel et al. ................. 340/568.1 |
| 2003/0156033 | A1 | 8/2003 | Savage et al. |
| 2004/0024501 | A1* | 2/2004 | Muehl et al. .................. 701/29 |
| 2004/0056779 | A1 | 3/2004 | Rast |
| 2005/0022470 | A1 | 2/2005 | Focke et al. |
| 2006/0022056 | A1 | 2/2006 | Sakama |
| 2006/0043178 | A1* | 3/2006 | Tethrake et al. .............. 235/385 |
| 2007/0171081 | A1* | 7/2007 | Dixon et al. ................ 340/572.8 |
| 2008/0129453 | A1* | 6/2008 | Shanks et al. ............... 340/10.1 |
| 2008/0177267 | A1 | 7/2008 | Sands et al. |
| 2009/0280862 | A1 | 11/2009 | Loughlin et al. |
| 2010/0096455 | A1 | 4/2010 | Binmore |
| 2010/0252626 | A1 | 10/2010 | Elizondo et al. |
| 2011/0101113 | A1 | 5/2011 | Koujima et al. |
| 2011/0273296 | A1 | 11/2011 | Laase et al. |

FOREIGN PATENT DOCUMENTS

| | | |
|---|---|---|
| JP | 2006042059 A | 2/2006 |
| JP | 2006142402 A | 6/2006 |
| JP | 2008159311 A | 6/2006 |

OTHER PUBLICATIONS

Canadian Office Action for Related Patent Application No. 2,815,864; Report dated Jun. 9, 2016.
European Search Report for Related Patent Application No. 13171917; Report dated Jun. 13, 2016.

* cited by examiner

PRODUCTION TOOL HAVING RFID DEVICE MOUNTED WITHIN A DIELECTRIC INCLUSION

This application claims the benefit of priority of provisional application 61/504,168 filed 1 Jul. 2011, which is incorporated herein by reference.

BACKGROUND

A factory for producing large commercial aircraft may include thousands of high-precision tools dispersed over a very large area. Floor areas of the largest factories are on the order of millions of square feet.

Keeping track of the locations of portable tools in these factories is a daunting task. RFID tags may be embedded in the tools, but the embedded tags have limited ranges.

SUMMARY

According to an embodiment herein, an apparatus comprises a portable production tool having a dielectric inclusion, and an RFID device mounted within the dielectric inclusion.

According to another embodiment herein, a portable production tool comprises a solid dielectric portion having inner walls that define a dielectric inclusion, and an RFID device within the dielectric inclusion, the RFID device attached to one of the inner walls. The dielectric inclusion is configured to cause electromagnetic waves incident on the tool to create incident and reflected waves, which undergo constructive interference.

According to another embodiment herein, a factory comprises a plurality of portable production tools at various locations within the factory. Each tool has a dielectric inclusion and an RFID device within the dielectric inclusion. Each RFID device stores information about its corresponding tool. The factory further comprises a plurality of RFID readers distributed about the factory, and a processing system, responsive to the readers, for tracking the locations of the tools within the factory.

These features and functions may be achieved independently in various embodiments or may be combined in other embodiments. Further details of the embodiments can be seen with reference to the following description and drawings.

DETAILED DESCRIPTION

Figure 1:
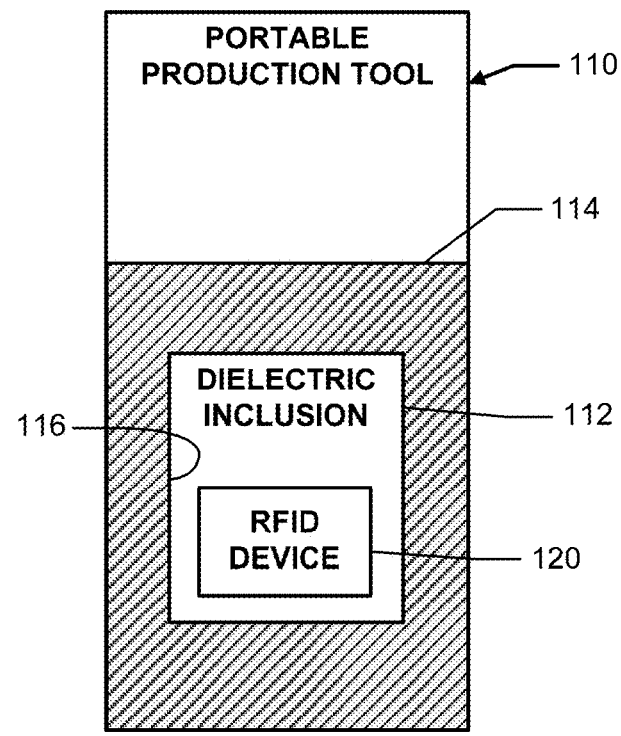
FIG. 1 is an illustration of a portable production tool having a dielectric inclusion and an RFID device mounted in the dielectric inclusion.

Reference is made to FIG. 1, which illustrates a portable production tool 110 having a dielectric inclusion 112 and a radio frequency identification (RFID) device 120 mounted in the dielectric inclusion 112. The production tool 110 is not limited to anything in particular. Examples of the tool 110 may include, without limitation, manual tools such as screw drivers, wrenches, and portable power feed tools, and other larger shop tools such as grinders, saws, and lathes.

That portion 114 of the tool 110 having the dielectric inclusion 112 is made of a non-conducting material. The portion 114 may be part of, for example, a handle, tool holder, tool case, or tool cover of the tool 110.

The dielectric inclusion 112 includes a cavity that is defined by inner walls 116 of the tool portion 114. The RFID device 120 may be mounted to one of the walls 116. There is space between the other walls 116 and the RFID device 120. The space is filled with a dielectric inclusion medium. The shape of the dielectric inclusion 112 is not limited to anything in particular, except to follow the contour of the tool 110. Examples of the shape of the dielectric inclusion 112 may include, without limitation, cuboid (box shape), right circular cylinder, annular shaped cavity, and C-shaped.

The electrical property (permittivity) of the material used to make the tool portion 114 is different than that of the inclusion medium. The permittivity of the tool portion 114 may be higher or lower than that of the dielectric inclusion medium 112. In some embodiments, the permittivity of the dielectric inclusion medium is unity, which constitutes an air box.

The dielectric inclusion 112 creates a discontinuity in the tool portion 114. Due to this discontinuity, electromagnetic waves (from an RFID reader during interrogation, or the RFID device 120 during transmission) incident on the tool 110 undergo reflections. Depending on the size, shape, location, and permittivity of the dielectric inclusion 112 and size, shape, and permittivity of the tool portion 114, incident and the reflected waves undergo constructive interference. The constructive interference enhances electromagnetic field strength at specific locations within the tool.

Figure 2:
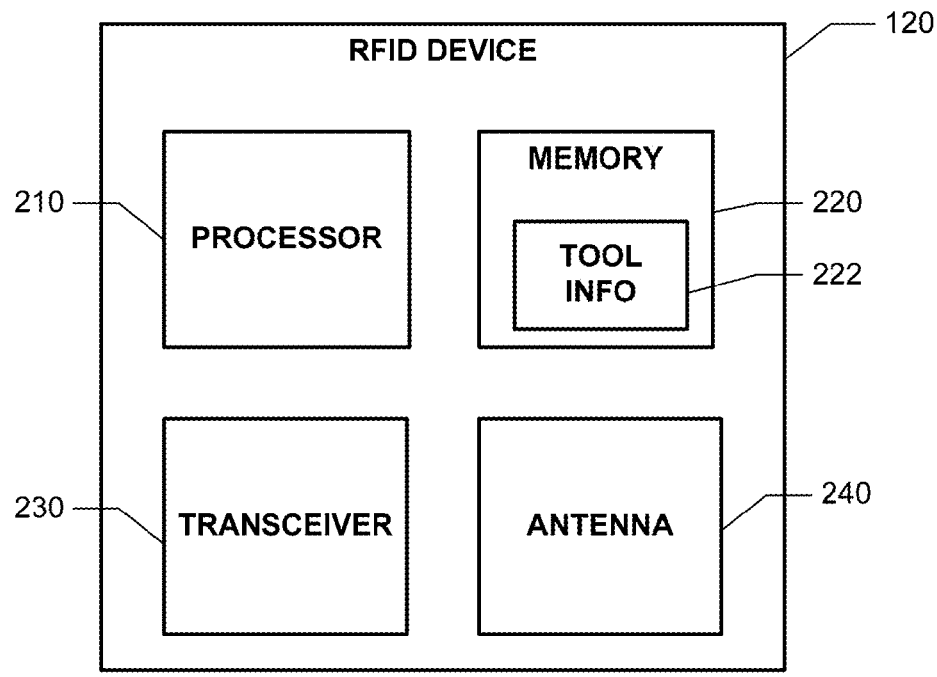
FIG. 2 is an illustration of an example of an RFID device.

Reference is made to FIG. 2, which illustrates an example of an RFID device 120. The RFID device 120 of FIG. 2 includes a processor 210, machine-readable memory 220, transceiver 230, and antenna 240. The antenna 240 may be linearly polarized. In some embodiments, the RFID device 120 may be supplied with operating power by a battery or other internal source. In other embodiments, the power may be harvested or it may be supplied by the tool 110 or other external source.

Tool information 222 is stored in the memory 220. The tool information 222 may identify the tool 110, for instance, by a number (e.g., a part number, serial number, etc.). The information 222 may identify a production job to be performed by the tool 110. A production job may be identified, for instance, by assembly procedure number. The information 222 may identify tool characteristics, such as weight, precision, hammering force, etc.

Figure 3:
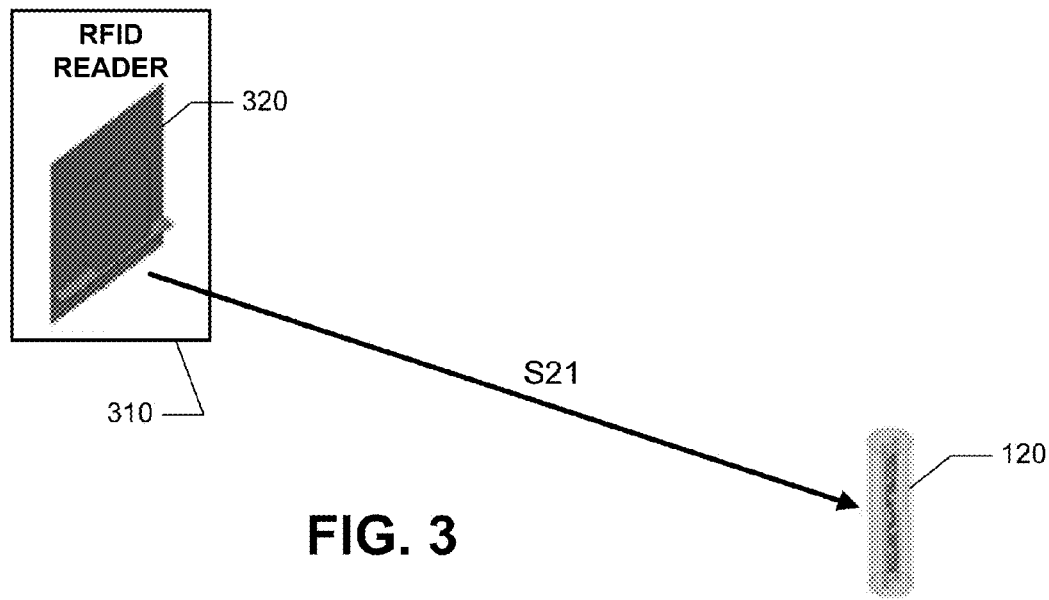
FIG. 3 is an illustration of a portable tool and an RFID reader.

Additional reference is made to FIG. 3, which shows the tool 110 within communication range of an RFID reader 310. The reader 310 may include a circularly polarized RFID reader antenna 320. The electric field of the electromagnetic wave radiated by a circularly polarized antenna rotates as a function of time. The linearly polarized antenna 240 of the RFID device 120 may be read by the circularly polarized antenna of the RFID reader 310 irrespective of the orientation of the RFID device 120.

When interrogated by the RFID reader 310, the RFID device 120 communicates tool information 222 to the reader 310. In some embodiments, the communications may be bi-directional, whereby the RFID reader 310 may also send data to the RFID device 120.

Locating the RFID device 120 within the tool portion 114 offers certain advantages. Whereas RFID devices mounted on an outer surface of a tool can hinder the tool performance, the RFID device 120 does not hinder tool performance. Further, the RFID device 120 is protected from environmental effects and wear and tear due to handling. It is also protected against tampering. Still further, the RFID device 120 will not fall off the tool 110 and become lost.

Locating the RFID device 120 within the dielectric inclusion 112 provides a significant advantage. Consider the antennas of the RFID reader 310 and the RFID device 120 as two ports of a two port network. S21 is a measure of coupling between the two antennas. The applicants have conducted tests and found that the S21 coupling for an RFID device 120 within an air box (a type of dielectric inclusion 112) of the tool 110 is substantially higher than the S21 coupling for an RFID device that is simply embedded within a tool.

Locating the RFID device 120 within the dielectric inclusion 112 substantially extends communications range of the RFID device 120. Consequently, communications between the RFID device 120 and the RFID reader 310 may be performed over greater distances. The extended range is especially advantageous for factories having very large floor areas and a large number of portable tools, as it makes tool tracking more feasible. A fewer number of RFID readers 310 would be needed to communicate with a large plurality of RFID devices 120.

Figure 4:
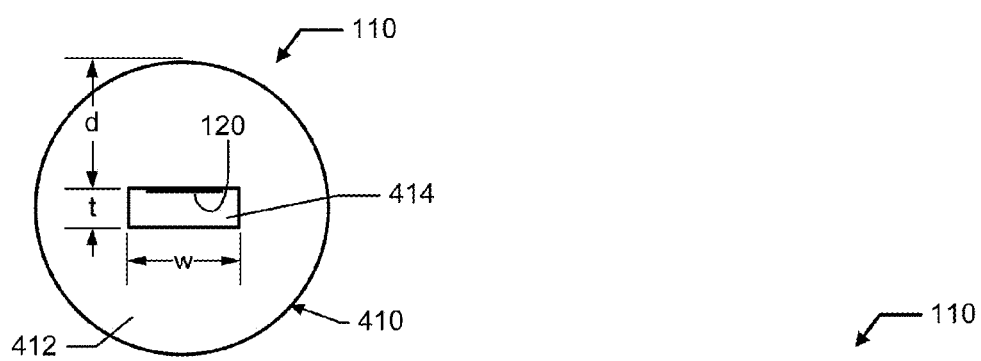
FIG. 4 is an illustration of a first tool body having an RFID device mounted in a dielectric inclusion.

Reference is now made to FIG. 4, which illustrates a tool 110 including a tool body 410 having a cylindrical shape. In some embodiments, the tool body 410 may be a tool handle. The tool body 410 has a solid portion 412 and a dielectric inclusion 414. Although the dielectric inclusion 414 is not limited to any particular geometry, it may have the geometry of a rectangular prism. An RFID device 120 is attached to an inner wall defining the dielectric inclusion 414 and extends in an axial direction. The RFID device 120 may be attached to the surface using an adhesive or fasteners. The dielectric inclusion 414 may include a dielectric medium having a lower permittivity than the material of the solid portion 412. As a first example, the solid portion 412 may be made of polytetrafluoroethylene (PTFE), and the inclusion medium may be air. As a second example, the inclusion medium may be a liquid material that solidifies naturally or with thermal treatment. The solidified liquid may help in securing the RFID device 120 within the dielectric inclusion 414.

The dielectric inclusion 414 has a length (not illustrated), width (w) and thickness (t). The dielectric inclusion 414 is positioned at a distance (d) from the surface of tool body 410. The distance (d) to the surface and the thickness (t) of the dielectric inclusion 414 are chosen such that due to constructive interference the electromagnetic field enhancement occurs. The applicants have observed for a dielectric inclusion medium of air and a cylindrical tool body 410 made of PTFE and having a diameter of 32 mm, the field enhancement occurs for d greater than 6 mm when t is equal to 9 mm. If t is reduced to 4 mm, the field enhancement occurs if d is greater than 5 mm. It is observed that as t increases, the minimum value of d that achieves field enhancement also increases. Other combinations of t and d may result in field enhancement. Electromagnetic analysis and measurements may be used to identify these combinations.

Figure 5:
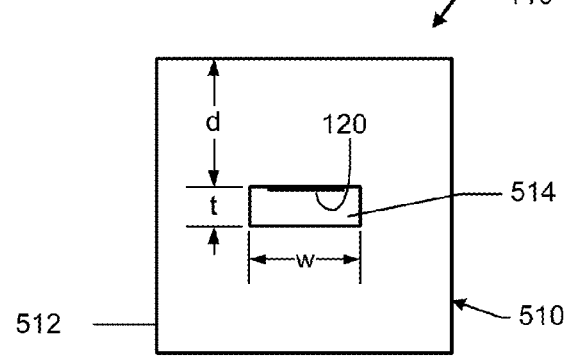
FIG. 5 is an illustration of a second tool body having an RFID device mounted in a dielectric inclusion.

FIG. 5 illustrates another example of a tool 110. The tool 110 of FIG. 5 includes a tool body 510 in the shape of a rectangular prism and a dielectric inclusion 512 also in the shape of a rectangular prism. An RFID device 120 is mounted to an inner wall of the tool body 510 and extends in an axial direction. Consider a tool body 510 that is made of PTFE and has a 32 mm by 32 mm cross section and t=9 mm. The applicants observed field enhancement for d>6 mm. When t was reduced to 7 mm, the observed field enhancement was observed for d>5 mm. Further reducing t to 5 mm resulted in a range of 5 mm<d<11 mm for which field enhancement was observed. On reducing the value of t to 4 mm, the field enhancement occurred for 3 mm<d<8 mm. Here also the applicants have observed field enhancement beyond a specific value of d.

Figure 6:
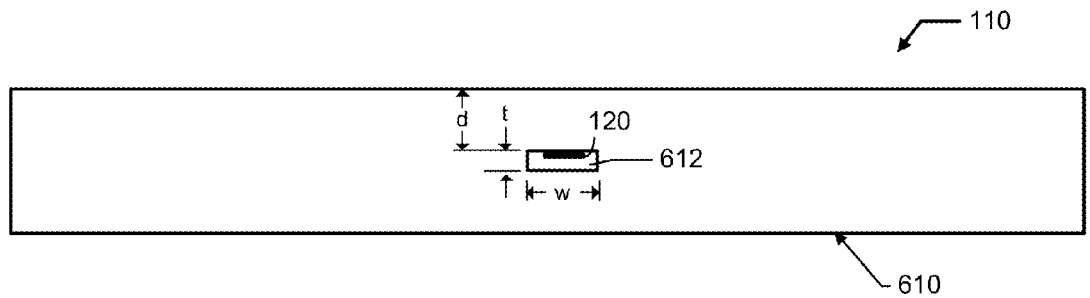
FIG. 6 is an illustration of a third tool body having an RFID device mounted in a dielectric inclusion.

FIG. 6 illustrates another example of a tool 110. The tool 120 of FIG. 6 includes a body 610 having a planar shape and a dielectric inclusion 612 extending along a plane of the tool body 610. An RFID device 120 may be adhesively bonded to the surface of the dielectric inclusion 612. Due to the change in the aspect ratio of the cross section of the tool 110, for a given value of t, field enhancement is observed if the value of d is below a certain depth. For example, field enhancement is observed for t=9 mm and d<8 mm. For t=4 mm, the maximum value of d at which field enhancement occurs is also reduced to 5 mm.

Structurally the examples of FIGS. 5 and 6 are very similar and differ only in aspect ratio. However, the electrical performances are very different.

Figure 7:
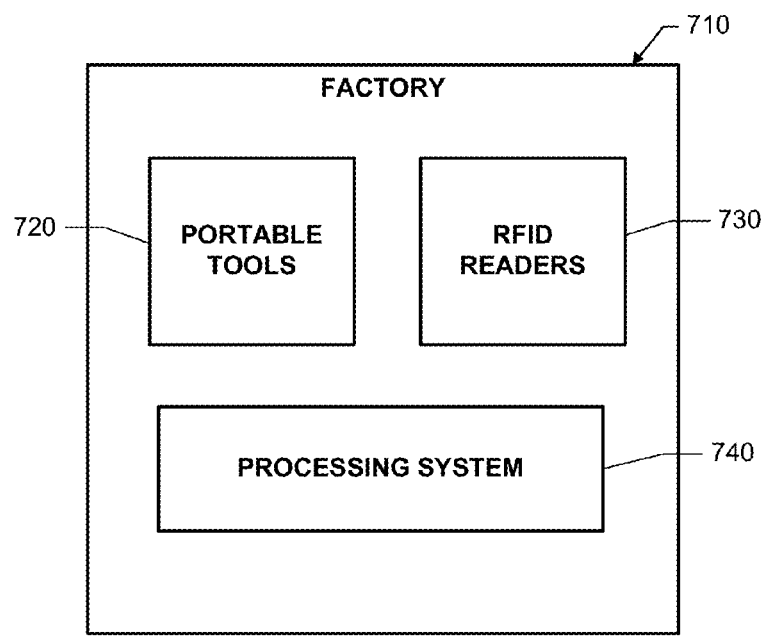
FIG. 7 is an illustration of a factory including a plurality of tagged production tools.

Reference is now made to FIG. 7, which illustrates a factory 710 for producing a complex system. The factory 710 includes a large plurality of production tools at various locations within the factory 710. The production tools may be used to fabricate parts from raw materials, assemble parts and assemblies into larger assemblies, etc. A factory 710 for producing commercial aircraft may include thousands of high-precision tools dispersed over millions of square feet.

The production tools may include tools (e.g., milling machines) that are fixed to a location in the factory 710. The production tools may also include portable tools 720, which may be moved from location to location within the factory 710. At least some of the portable production tools 720 have dielectric inclusions and RFID devices within the dielectric inclusions as described herein. The RFID devices may store and communicate information about their tools (e.g., tool identification number, tool characteristics, job identifier).

The factory 710 further includes a plurality of RFID readers 730 distributed about the facility. Each RFID reader 730 is programmed to interrogate RFID devices. As a result of the extended range of the RFID devices herein, a fewer number of readers 730 may be distributed about the factor 710, and still be able to communicate with all of the RFID devices. In addition, RFID readers 730 may be placed at select locations, such as dock doors, work stations, tool cribs, etc.

Information detected by the RFID readers 730 may be forwarded to a processing system 740. The processing system 740 tracks the locations of the portable tools 720 and ensures that the portable tools 720 are being used on the correct job. Consequently, the processing system 740 can prevent tools from being left behind in an assembly by accident. The processing system 740 may also prevent tools from being removed from the factory, and it can manage the inventory of tools.

The processing system 740 may also ensure that the tools are properly calibrated. For instance, an RFID tag could indicate the last date of calibration by an instrument laboratory. The processing system 740 may use that information to determine when a portable tool 720 should be recalibrated.

Information detected by the RFID readers 730 may be forwarded to a processing system 740. The processing system 740 collects unique ID signals transmitted from the RFID readers 730 using software middleware that interfaces to the readers 730. This detection is performed continuously in real time. The processing system 740 may match the unique ID information to an asset name and send this data to other integration processors such as an enterprise resource planning (ERP) database.

The processing system 740 tracks the locations of the portable tools 720 and sends this information to electronic work instructions within manufacturing execution system to verify portable tools 720 are being used on the correct job. Consequently, the processing system 740 may provide critical information to prevent wrong tools used on the jobs and establishes traceability from the tool unique ID to the job ID for facilitating tool utilization so they are not left behind in an assembly by accident. The processing system 740 may also prevent tools from being removed from the factory by linking the tool ID to a mechanic badge ID, and it can manage the inventory of tools.

The processing system 740 may also ensure that the tools are properly calibrated. For instance, an RFID device indicates the last date of calibration by an instrument laboratory. The processing system 740 may use that information to determine when a portable tool 720 should be recalibrated. The processing system 740 sends the calibrated tool's unique ID to a metrology system database. This database maintains the reference to the tool calibration expiration date. If a calibrated tool approaches the expiration date, an electronic alert notice is sent out to the tool custodian to return the tool to the calibration certification laboratory. If the custodian forgets to follow this message and the tool is accidently used in a production process, the RFID device can be traced from the processing system and its associated work instruction system to facilitate the auditing process and rectify the error.

The invention claimed is:

1. Apparatus comprising a portable production tool having a dielectric inclusion, the dielectric inclusion including a cavity within a portion of the tool; and an RFID device mounted within the cavity, the RFID device including an antenna located entirely within the cavity, the dielectric inclusion configured to cause electromagnetic waves incident on the tool to create reflected waves, the incident and reflected waves undergoing constructive interference to extend communications range of the RFID device.

2. The apparatus of claim 1, wherein the tool portion is made of dielectric material; and wherein the dielectric inclusion is entirely within the tool portion and completely surrounded by the dielectric material.

3. The apparatus of claim 2, wherein the tool portion is part of a tool handle.

4. The apparatus of claim 2, wherein the dielectric inclusion includes air within the cavity.

5. The apparatus of claim 2, wherein the dielectric inclusion has a permittivity of unity.

6. The apparatus of claim 2, wherein the cavity is defined by an inner wall of the tool portion; and wherein the RFID device is attached to the inner wall.

7. The apparatus of claim 6, wherein the dielectric inclusion further includes an inclusion medium filling the cavity, the inclusion medium made of a material having a different permittivity than the dielectric material of the tool portion.

8. The apparatus of claim 2, wherein the cavity is defined by at least one inner wall of the tool portion, and wherein a homogeneous dielectric inclusion medium fills all space between the RFID device and the at least one inner wall, the dielectric inclusion medium made of a material having a different permittivity than the dielectric material of the tool portion.

9. The apparatus of claim 1, wherein the antenna is linearly polarized.

10. A portable production tool comprising:
a solid dielectric portion having inner walls that define a dielectric inclusion; and
an RFID device within the dielectric inclusion, the RFID device attached to one of the inner walls;
the dielectric inclusion configured to create a discontinuity that causes incident electromagnetic waves generated by the RFID device to undergo reflections, which undergo constructive interference with the incident waves.

11. The tool of claim 10, wherein the solid dielectric portion is part of a tool handle.

12. The tool of claim 10, wherein the dielectric inclusion includes air between the walls and the RFID device.

13. The tool of claim 10, wherein the dielectric inclusion has a permittivity of unity.

14. The tool of claim 10, wherein the RFID device is attached to the solid dielectric portion at a wall defining the dielectric inclusion; and wherein an inclusion medium fills a space between the RFID device and other walls defining the dielectric inclusion.

15. A factory comprising:
a plurality of portable production tools at various locations within the factory, each tool having a portion containing a dielectric inclusion, the dielectric inclusion including a cavity, and an RFID device including an antenna entirely within the cavity, each RFID device storing information about its corresponding tool, the dielectric inclusion configured to create a discontinuity in the tool portion, which causes electromagnetic waves incident on the tool to create reflected waves, the incident and reflected waves undergoing constructive interference to extend communications range of the RFID device;
a plurality of RFID readers distributed within the factory; and
a processing system, responsive to the readers, for tracking the locations of the tools within the factory.

16. The factory of claim 15, wherein the processing system also ensures that the tools are being used on a designated job.

17. The factory of claim 15, wherein the processing system also ensures that the tools are not accidently left behind in an assembly.

18. The factory of claim 15, wherein processing system also ensures that the tools are calibrated.

19. The factory of claim 15, wherein the factory is an aircraft factory.

20. The apparatus of claim 2, wherein the dielectric inclusion has a length, thickness and width, and wherein the constructive interference causes field enhancement as a function of the thickness of the dielectric inclusion and a non-zero distance from the dielectric inclusion to an outer surface of the tool portion.

* * * * *